(12) United States Patent
Wilson et al.

(10) Patent No.: US 8,235,317 B2
(45) Date of Patent: Aug. 7, 2012

(54) ADJUSTABLE GRINDER AND A STATOR FOR THE ADJUSTABLE GRINDER

(75) Inventors: Tracie Wilson, Westminster, MD (US); John Rzepka, Fairfax, VA (US); Olivier Rattin, Althen des Paluds (FR); Sebastien Rime, Gevingey (FR)

(73) Assignee: McCormick & Company, Incorporated, Sparks, MD (US)

( * ) Notice: Subject to any disclaimer, the term of this patent is extended or adjusted under 35 U.S.C. 154(b) by 26 days.

(21) Appl. No.: 12/833,630

(22) Filed: Jul. 9, 2010

(65) Prior Publication Data
US 2012/0006922 A1  Jan. 12, 2012

(51) Int. Cl.
*A47J 42/00* (2006.01)
(52) U.S. Cl. .................................................. 241/169.1
(58) Field of Classification Search ............. 241/168, 241/169.1
See application file for complete search history.

(56) References Cited

U.S. PATENT DOCUMENTS

| | | | |
|---|---|---|---|
| 6,655,616 B1 * | 12/2003 | Wagner | 241/169.1 |
| 6,851,635 B2 * | 2/2005 | McCowin | 241/169.1 |
| 7,207,511 B2 * | 4/2007 | Ng | 241/101.3 |
| 7,543,771 B2 * | 6/2009 | Wang Wu | 241/169.1 |
| 2002/0117566 A1 * | 8/2002 | Cheng | 241/169.1 |
| 2002/0145065 A1 * | 10/2002 | McCowin | 241/169.1 |
| 2005/0211806 A1 * | 9/2005 | Ng | 241/169.1 |
| 2008/0315021 A1 * | 12/2008 | Tang | 241/169.1 |
| 2008/0315022 A1 * | 12/2008 | Wilson et al. | 241/169.1 |
| 2009/0134256 A1 * | 5/2009 | Rice | 241/169.1 |
| 2010/0163658 A1 | 7/2010 | Wheaton | |

OTHER PUBLICATIONS

U.S. Appl. No. 13/117,646, filed May 27, 2011, Wilson, et al.
International Search Report and Written Opinion of the International Searching Authority issued Oct. 31, 2011, in PCT/US11/42386.

* cited by examiner

*Primary Examiner* — Faye Francis
(74) *Attorney, Agent, or Firm* — Oblon, Spivak, McClelland, Maier & Neustadt, L.L.P.

(57) ABSTRACT

An adjustable grinder, includes a container, a stator, a rotor, a drum, and a rotary slide. The container can hold a product to be ground. The stator is positioned on the container. The rotor is positioned opposite to the stator and can rotate with respect to the stator. The stator and the rotor each contain at least two rows of teeth to grind the product therebetween. The drum is positioned around the rotor. The rotary slide includes a pointer that can be adjusted such that a distance between the stator and the rotor increases or decreases. Additionally, the stator may include at least two extended teeth.

14 Claims, 9 Drawing Sheets

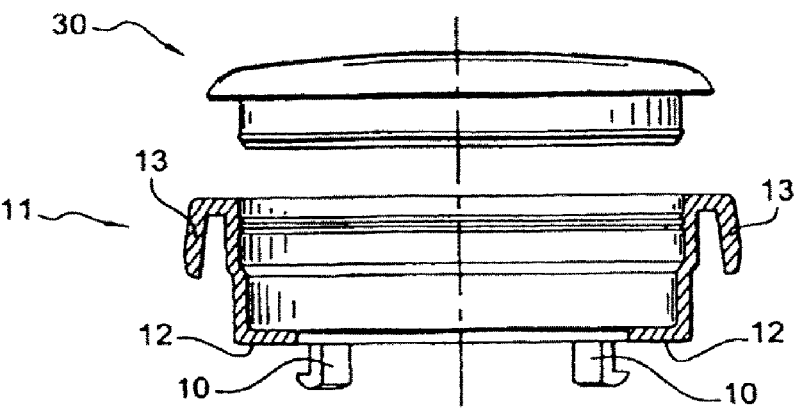
Fig. 8
Fig. 7
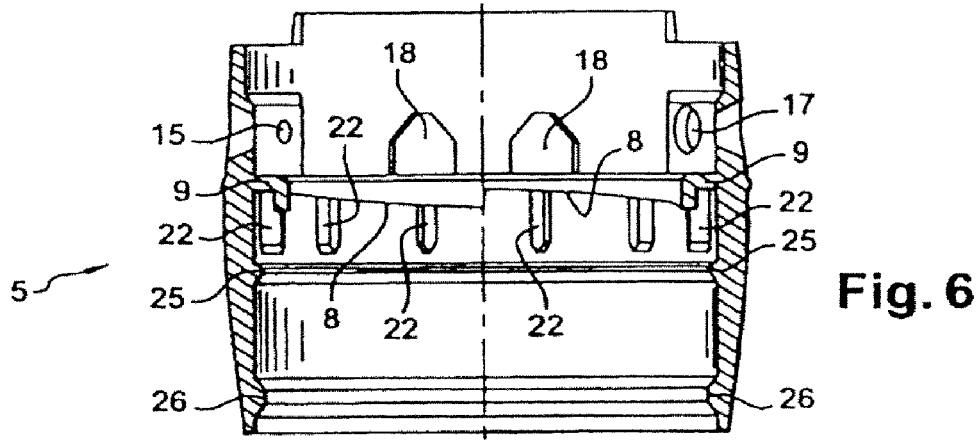
Fig. 6
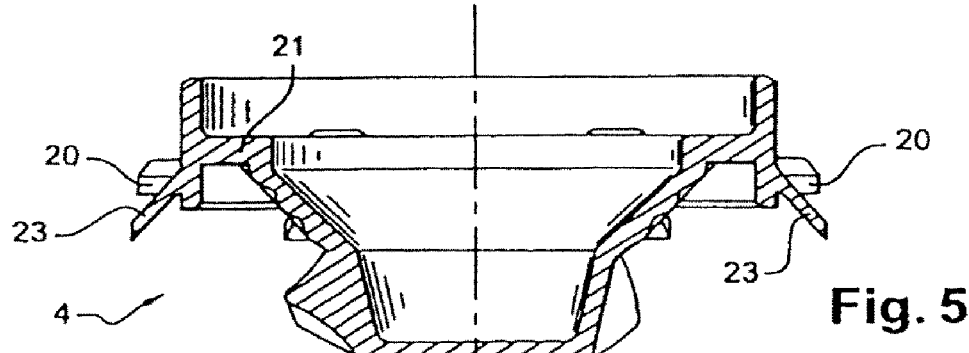
Fig. 5
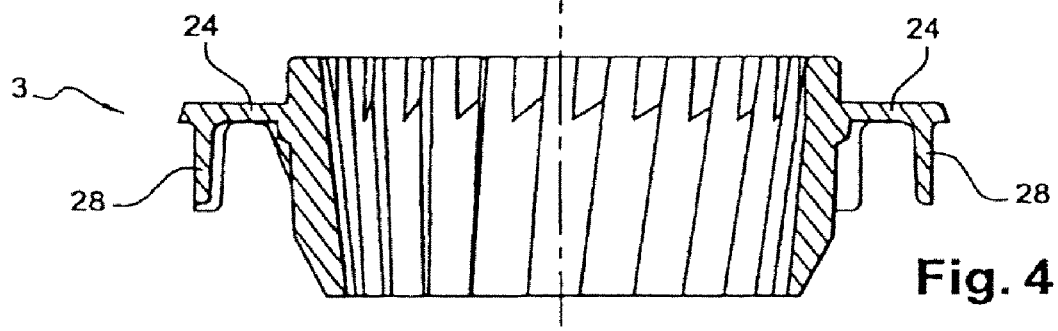
Fig. 4

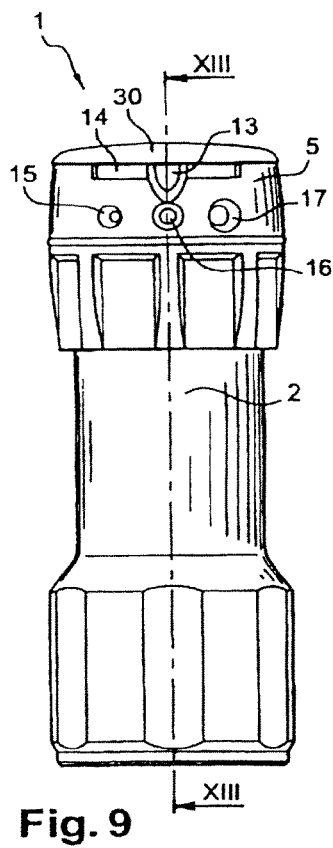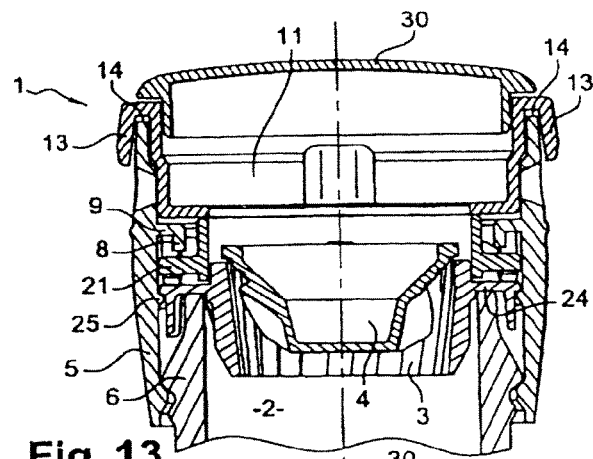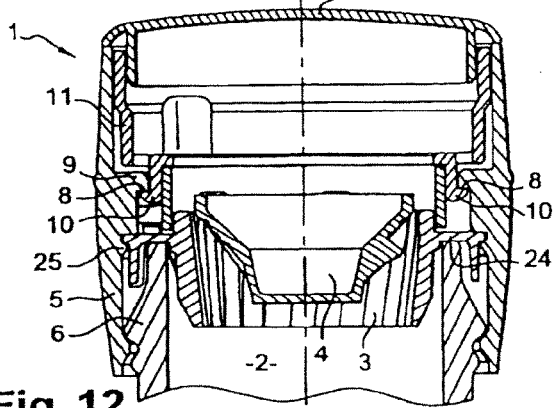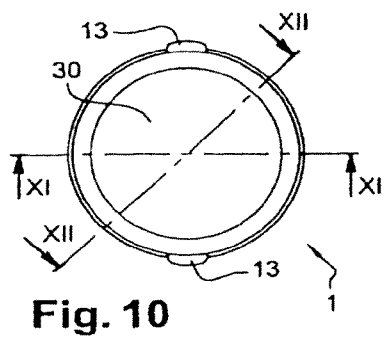
Fig. 9
Fig. 10
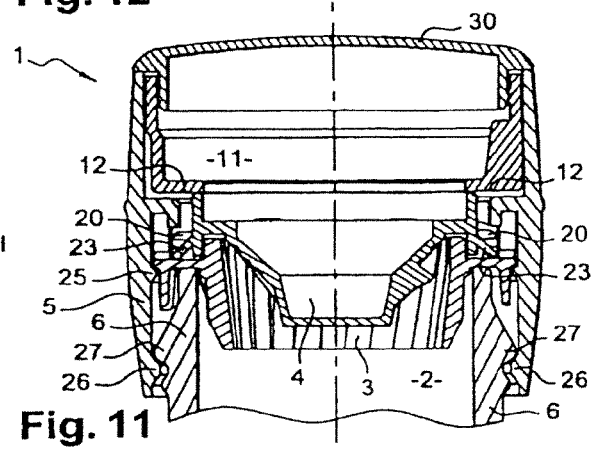
Fig. 13
Fig. 12
Fig. 11

ADJUSTABLE GRINDER AND A STATOR FOR THE ADJUSTABLE GRINDER

BACKGROUND OF THE INVENTION

1. Field of the Invention

The present invention relates to an adjustable grinder for grinding grain-like condiments, such as pepper, salt, and berries, contained in a reservoir to which there is fitted a grinding device. The present invention also relates to a stator for the adjustable grinder.

2. Description of the Related Art

Conventional grinding devices are composed of a stator and a rotor, at least one of which is provided with teeth to form a jaw.

In such a device, the rotor is driven rotationally by way of a drum forming the body of the device, fixed on the neck of the reservoir but able to rotate freely. In contrast, the stator is immobilized with respect to rotation relative thereto.

Mills for grinding condiments of this type are provided with means for adjusting the ground product, acting on the jaw spacing formed by the rotor and the stator by varying the axial position of the rotor relative to the stator. These latter components represent frustoconical bodies of revolution, albeit having different conicities, in such a way that the displacement of one relative to the other causes the spacing and consequently the adjustment to vary.

For example, known systems make this adjustment of the rotor relative to the stator by way of a screw system. However, in this case it is often not possible to provide marks for positioning the stator relative to the rotor, and so it is often not possible to identify the grinding fineness, which is selected according to taste and can vary from one consumer to another.

To remedy this shortcoming, different systems have already been proposed in order to achieve an adjustment of the ground product in graduations, such as described in International Patent Application No. WO 2004/037057, by making the rotor integral with an annulus furnished with pins intended to be positioned in openings of the body, the openings being furnished with notches corresponding to different sizes of the ground product.

Also according to this embodiment, the openings are inclined in such a way that the rotational movement of the annulus induces an axial translational movement of the rotor, modifying the distance between it and the stator that is complementary to it.

However, such a device typically does not permit continuous adjustment of the ground product because the rotor is integral with the adjusting element, which must be locked in the body to form the rotor of the mill.

SUMMARY OF THE INVENTION

One example of the invention provides an adjustable grinder for grinding grain-like condiments that includes a reservoir, a drum, a rotor, a stator, and a rotary element. The stator and the rotor each contain at least two rows of teeth. The adjustable grinder typically contains multiple settings and each setting corresponds to a different grain size of the ground condiments. The stator may also include at least two extended teeth.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 depicts an axial sectional view of an exemplary embodiment of a stator;

FIG. 5 depicts an axial sectional view of an exemplary embodiment of a rotor;

FIG. 6 depicts an axial sectional view of an exemplary embodiment of a rotary drive member of the rotor;

FIG. 7 depicts an axial sectional view of an exemplary embodiment of an adjusting slide;

FIG. 8 depicts a front view of an exemplary embodiment of a cover;

FIG. 9 depicts a front view of an exemplary embodiment of an adjustable grinder;

FIG. 10 depicts a top view of the exemplary adjustable grinder according to FIG. 9;

FIG. 11 depicts a view in axial section according to line XI-XI of FIG. 10;

FIG. 12 depicts a view in axial section according to line XII-XII of FIG. 10;

FIG. 13 depicts a view in axial section according to line XIII-XIII of FIG. 9;

DETAILED DESCRIPTION OF THE INVENTION

Figures 1, 2, 3:
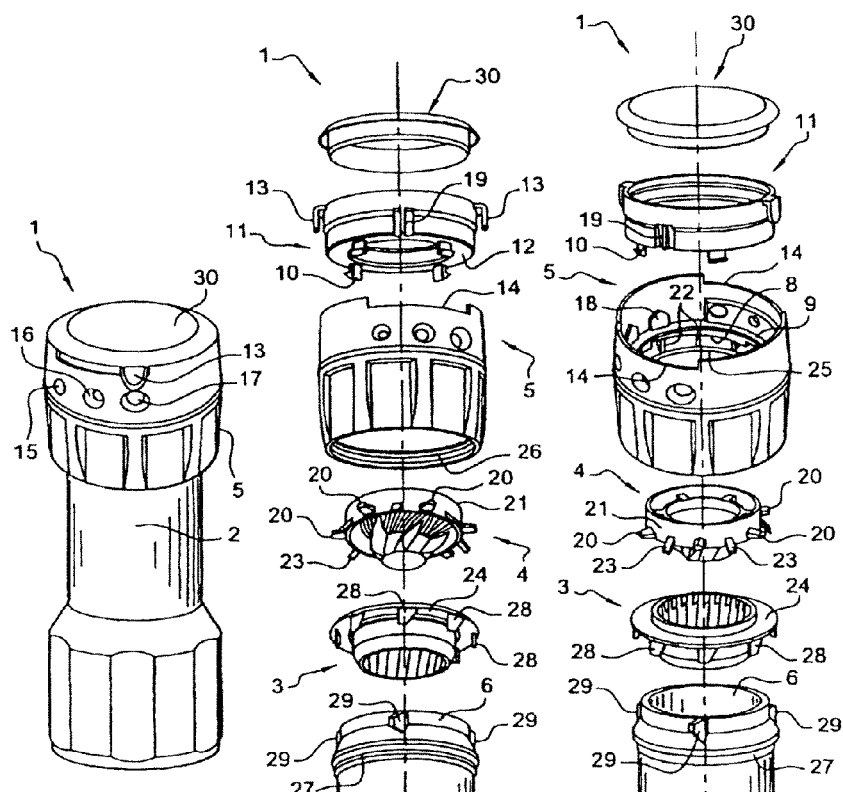
FIG. 1 depicts a perspective view of an exemplary embodiment of an adjustable grinder.
FIG. 2 depicts an exploded perspective view of the adjustable grinder shown in FIG. 1 from underneath.
FIG. 3 depicts an exploded perspective view of the adjustable grinder shown in FIG. 1 from above.

Certain terminology is used in the following description for convenience only and is not limiting. The words "top," "bottom," "above," "below," "lower," and "upper" designate directions in the drawings to which reference is made. The terminology includes the words noted above as well as derivatives thereof and words of similar import.

An adjustable grinder can contain grain-like condiments, such as pepper, salt, and berries, in a container. As shown in FIGS. 1-9, and as discussed in U.S. application Ser. No. 12/144,177, filed on Jun. 23, 2008 and incorporated herein by reference in its entirety, an adjustable grinder can include a grinding device, such as a stator 3, which can be fitted on a container, such as a reservoir 2. A rotor 4 can be provided opposite to the stator 3.

Figure 14:
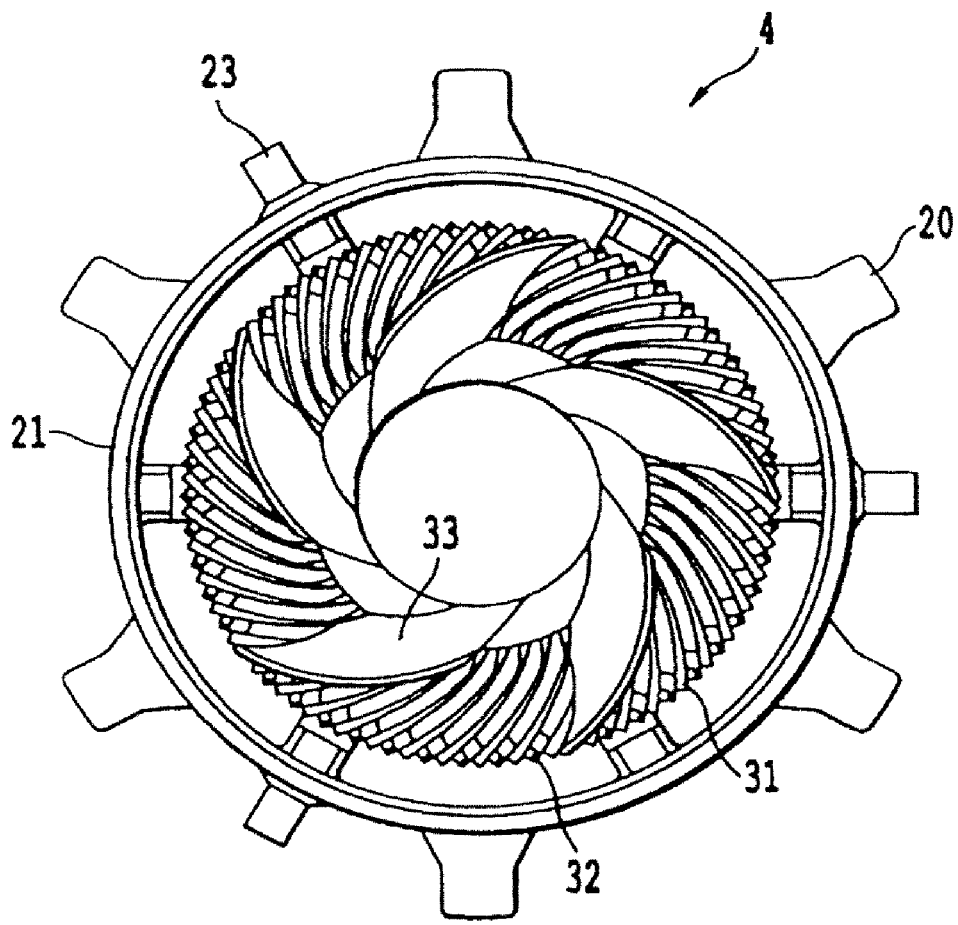
FIG. 14 depicts a bottom view of an exemplary embodiment of a rotor.
Figure 16:
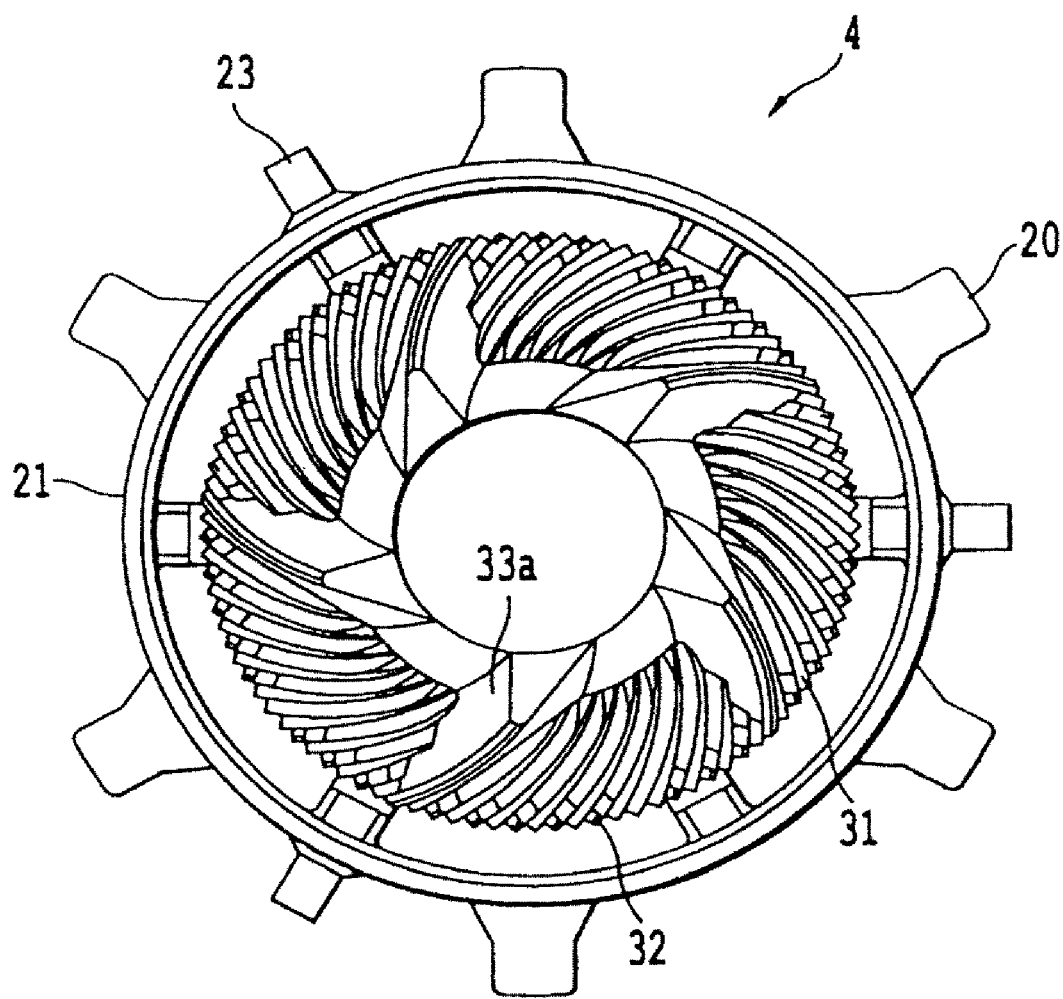
FIG. 16 depicts a bottom view of an exemplary embodiment of a rotor.

The rotor 4 has at least one row of teeth 31 (see FIG. 14) on the surface facing the stator 3 that can grind the product contained in the adjustable grinder 1. Additionally, the rotor 4 has a plurality of fingers (see FIG. 14) that can distribute a product to the teeth 31. As shown in FIG. 14, the fingers 33 may be helicoidal to help direct the product to the teeth. Alternatively, as shown in FIG. 16, the fingers 33a may be relatively straight such that a curvature of the fingers 33a matches the curvature of the teeth 31 and 32. Utilizing the relatively straight fingers 33a shown in FIG. 16 helps prevent the product to be ground from becoming trapped between the fingers 33a and the rotor 4, such that the rotor 4 is not prevented from rotating.

Figure 18:
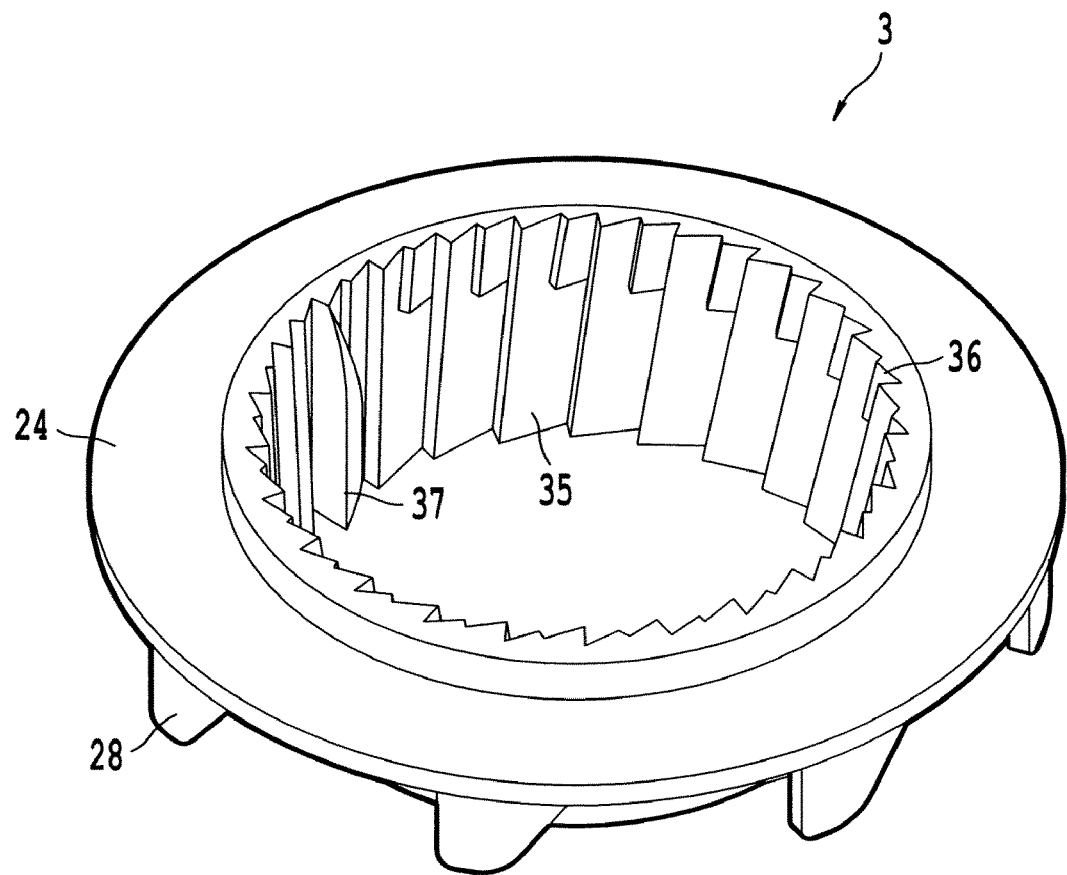
FIG. 18 depicts a top view of an exemplary stator.

The stator 3 also includes a plurality of teeth 35, 36 (see FIG. 18) that face the teeth 31 and 32 of the rotor 4 (see FIG. 16). The first row of teeth 35 extend from a top to a bottom of the stator 3. The second row of teeth 36 are smaller than the first row of teeth 35 and are positioned on a top of the stator 3 shown in FIG. 18 to assist in finely grinding the ground product. The stator 3 also includes at least two extended teeth 37. The extended teeth 37 extend outwardly further than the first and second rows of teeth 35, 36 at the bottom of the stator 3 shown in FIG. 18, and have a tapered shape such that they do not extend further then the first and second rows of teeth 35, 36 at the top of the stator 3.

Figure 19:
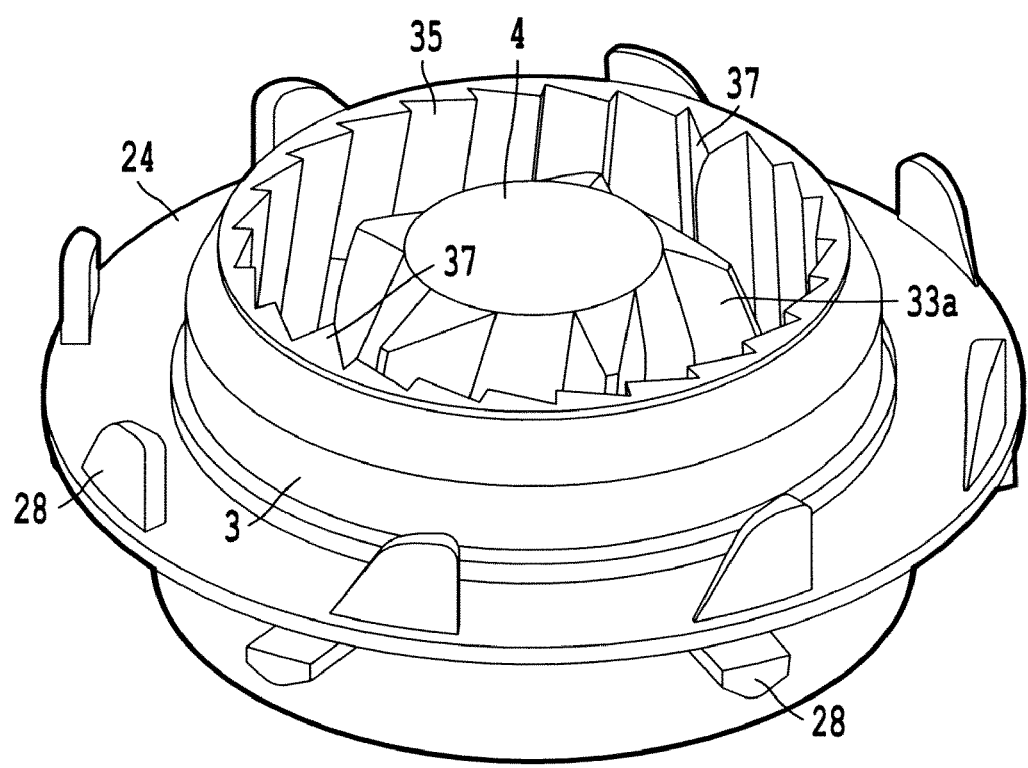
FIG. 19 depicts a bottom view of an exemplary stator and rotor fit together.

FIG. 19 shows the stator 3 (in an inverted orientation from FIG. 18) with the rotor 4 assembled thereto in the orientation at which the adjustable grinder 1 will be used. In the orientation of the stator shown in FIG. 19, the extended teeth 37 extend out further than the first row of teeth 35 at the top of the stator 3, but extend out a same distance as the first and second rows of teeth 35 and 36 at the bottom of the stator 3.

Accordingly, the product to be ground is forced from the top of the stator 3 and the rotor 4 shown in FIG. 19 towards the bottom of the teeth 31, 32, 35, and 36 by the fingers 33a from the rotor 4 and the extended teeth 37 from the stator 3. Specifically, the product becomes trapped in the area below the curvature of the fingers 33a by the extended teeth 37. As the rotor 4 is rotated relative to the stator 3, the area becomes smaller and smaller until the product is forced against the teeth 31, 32, 35, and 36 of the rotor 4 and stator 3. Thus, the extended teeth 37 and the fingers 33a can hold the product between the rotor 4 and stator 3 such that all of the product from the container 2 can be ground without popping back into the container 2.

As discussed more thoroughly below, the exemplary adjustable grinder 1 can produce the ground product in at least three different settings: fine, medium, and coarse. The distances between the teeth 35 and 36 of the stator 3 and the teeth 31 and 32 of the rotor 4 determine the size of the ground product and are adjusted by adjusting the pointer 13, as discussed below.

When the adjustable grinder 1 is in the fine setting, a height between the ring formed by the bottom of the teeth 35 and 36 of the stator 3 and the vertically adjacent portion of the teeth 31 and 32 of the rotor 4 can be, for example, 0.1 mm (0.0039"). An aperture opening, which is the closest distance between the bottom of the teeth 35 and 36 of the stator 3 and the vertically adjacent portion of the teeth 31 and 32 of the rotor 4, can be, for example, 0.07 mm (0.00276"). A maximum opening between the ring formed by the bottom of the teeth 35 and 36 of the stator 3 and the horizontally adjacent portion of the teeth 31 and 32 of the rotor 4 can be, for example, 0.09 (0.0035").

When the adjustable grinder 1 is in the medium setting, the height can be, for example, 0.8 mm (0.0315"). An aperture opening can be, for example, 0.53 mm (0.02087"). A maximum opening can be, for example, 0.71 (0.02795").

When the adjustable grinder 1 is in the coarse setting, a height can be, for example, 1.5 mm (0.0590"). An aperture opening can be, for example, 1.0 mm (0.03937"). A maximum opening can be, for example, 1.33 (0.05236").

The dimensions discussed above have been determined to produce suitable sizes of the ground product and to allow the contents of the container 2 to be completely emptied. However, the above dimensions are non-limiting exemplary embodiments and a person of ordinary skill in the art would understand that these dimensions can be varied to the extend extent that the adjustable grinder 1 is still suitable for its intended purpose.

The rotor 4 is driven rotationally by way of a drum 5 forming a part of the body of the adjustable grinder 1. The drum 5 is fixed on a neck 6 of the reservoir 2, but is able to rotate freely. In contrast, the stator 3 is blocked so that it cannot freely rotate around the neck 6 of the reservoir 2.

By varying the axial position of the rotor 4 relative to the stator 3, the grain size of the ground product can be adjusted as discussed below.

As can be seen in FIG. 6, the drum 5 includes at least one inclined surface 8 formed on an internal peripheral collar 9. As shown in FIG. 7, at least one follower element 10 is integrated with a rotary slide 11 housed within the drum 5. The rotary slide 11 can rotate relative to the drum 5. Additionally, the rotary slide 11 can contact the inclined surface 8 of the drum 5. As can be seen in FIGS. 5, 7, and 11, the rotary slide 11 has a flat lower face 12 on which the rotor 4 is freely braced such that the rotor 4 can be axially displaced. The rotary slide 11 also includes at least one pointer 13. Positioning of the pointer 13 can be obtained by continuous variable adjustment as a function of the desired fineness of the ground product.

The follower element 10 of the rotary slide 11 can include a plurality of catches which cooperate with the inclined surface 8 of the collar 9. The catches extend axially from the lower face 12 of the rotary slide 11. The catches can snap elastically from above onto the collar 9, and consequently onto the inclined surface 8 made on the lower face of the collar 9, in order to follow the inclined surface 8 during rotary movement of the rotary slide 11. The rotary movement of the rotary slide 11 down the inclined surface 8 corresponds to an adjustment of the spacing between the rotor 4 and the stator 3. Additionally, the follower element 10 can include a protruding section that can fit within a recessed section in the drum 5 to help hold the rotary slide 11 in place with respect to the drum 5. For example, the protruding section of the follower element 10 can fit within a recessed section when the pointer 13 points to each one of the visual marks 15, 16, 17 discussed below. Thus, a user can feel when a pointer 13 is pointing to each one of the visual marks 15, 16, 17.

In one exemplary embodiment, to achieve balance in the rotary movement during an adjustment, four catches of the follower element 10 and corresponding inclined surfaces 8 are provided and are distributed regularly over the periphery of their respective supports. In addition, the slide 11 is provided with at least one pointer 13 that serves as a position indicator and is formed by a bent-over flap of its upper peripheral rim. The at least one pointer 13 straddles the peripheral rim of a corresponding cut-out opening 14 made in the upper part of the peripheral wall of the drum 5 and whose lateral rims limit the adjustment travel. By adjusting the at least one pointer, a user can control a size of the ground product.

In one exemplary embodiment, the slide 11 is provided with two diametrically opposite pointers 13, capable of cooperating with two corresponding openings 14 of the drum 5 in such a way that they additionally form balanced manual control elements.

The peripheral wall of the drum 5 can be provided with visual marks 15, 16, 17 for the position of pointer(s) 13. Each of the visual marks 15, 16, 17 corresponds to predetermined sizes of the ground product. In an alternative exemplary embodiment, the at least one pointer 13 can extend further in an axial direction to cover at least part of the visual marks 15, 16, 17. Additionally, the at least one pointer 13 can have a ribbed texture to allow a user to easily slide the at least one pointer.

In one exemplary embodiment, the visual marks 15, 16, 17 are formed by three circular holes of different diameters, made in the wall of the drum 5. The three circular holes have different diameters, and each diameter corresponds to a particular grinding fineness. For example, when the pointer 13 points to the smallest diameter hole, the finest grain will be produced.

As discussed above, the rotor 4 typically has at least one row of teeth on the surface facing the teeth of the stator 3. In the exemplary rotor 4 shown in FIG. 14, the rotor 4 has a first row of teeth 31 and a second row of teeth 32. The first row of teeth 31 can contact the product to be ground to achieve grinding when the pointer 13 points to the visual mark corresponding to any of the predetermined sizes. However, the second row of teeth 32 can only contact the product to be ground to achieve grinding when the pointer points to the visual mark corresponding to the finest predetermined size. Similarly, the second row of teeth 36 of the stator 3 contact the product to be ground when the pointer points to the visual mark corresponding to the finest predetermined size. Thus, the second row of teeth 32 and the second row of teeth 36 are not used for grinding when the pointer points to the visual mark corresponding to the medium and coarse predetermined sizes. Accordingly, the exemplary adjustable grinder 1 can produce the ground product in accurate sizes even when the requested size is small.

In addition, the peripheral wall of the drum 5 can include acoustic indicators 18 to indicate the position of pointer(s) 13. The indicators 18 are preferably formed by fingers made on the inside face of the peripheral wall of the drum 5, and produce a click in conjunction with a raised flexible tongue 19 formed on the outside peripheral wall of the slide 11. The acoustic indicators 18 preferably produce an audible click when one of the pointers 13 is adjusted to each of the visual marks 15, 16, 17 to indicate that a certain grain fineness will be produced.

Figure 15:
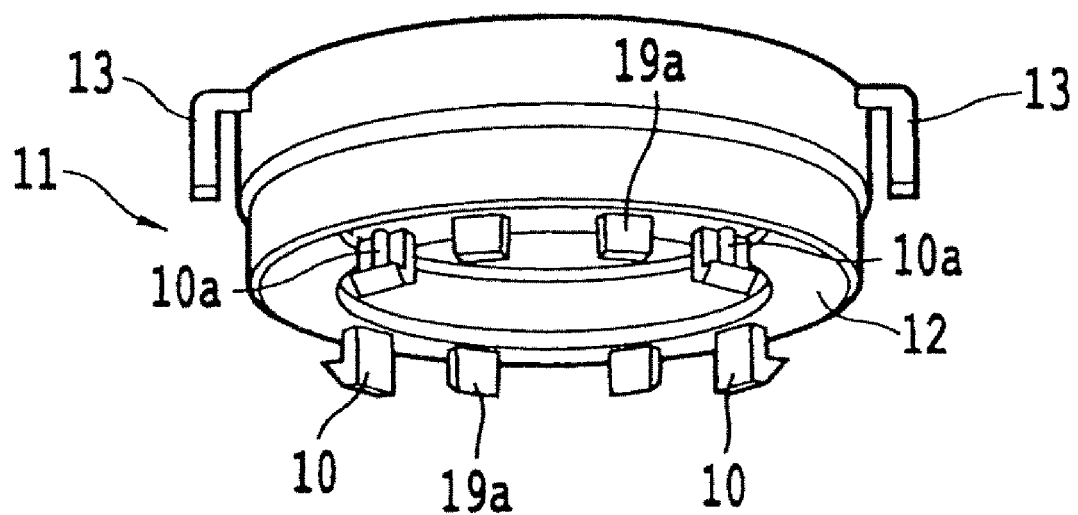
FIG. 15 depicts a view of an exemplary embodiment of a rotary slide.
Figure 17:
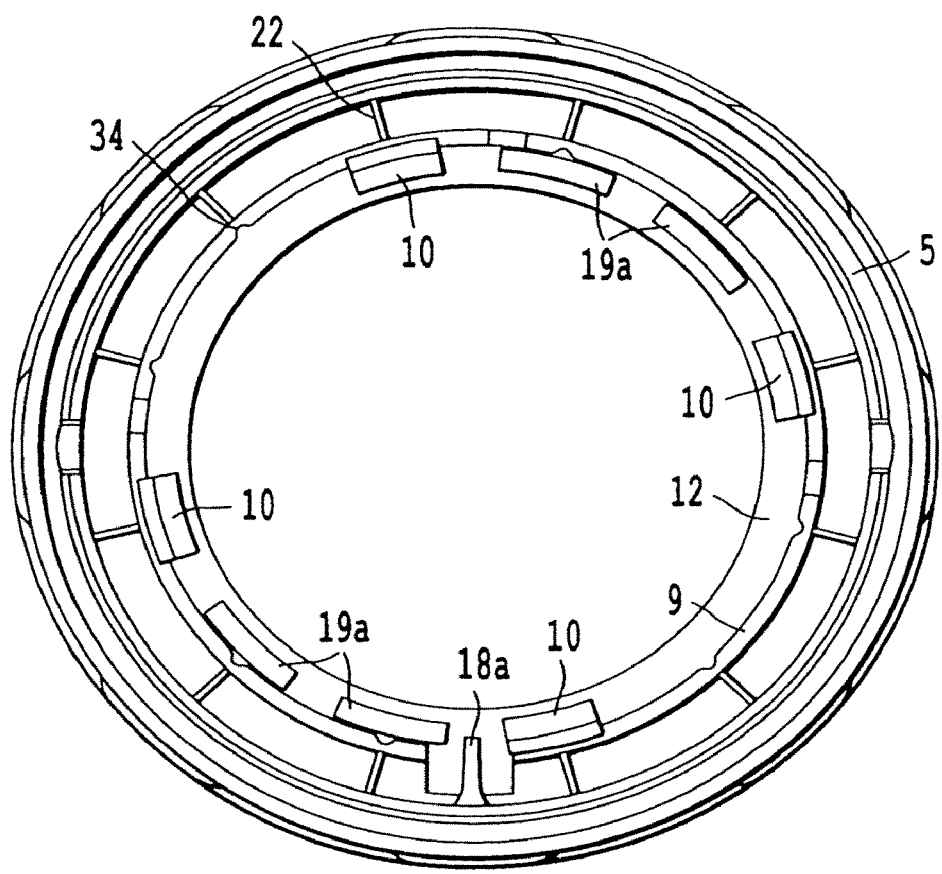
FIG. 17 depicts a bottom view of an exemplary embodiment of a rotor and a drum.

In an alternative embodiment, as shown in FIG. 17, the drum 5 can include at least one finger 18a positioned thereon in place of the indicators 18. The finger 18a can extend radially inward from the drum 5. The finger 18a can have a small width such that it is bendable. Additionally, as shown in FIG. 15, the rotary slide 11 can include a plurality of tabs 19a protruding therefrom and positioned between the follower elements 10. When the slide 11 is rotated by movement of the pointer 13, the tabs 19a contact the finger 18a such that an audible sound is produced when the finger 18a is released from one of the tabs 19a. Thus, when the pointer 13 is adjusted to one of the visual marks 15, 16, and 17, an audible sound is produced by the finger 18a and the tabs 19a. The tabs 19a can have predetermined widths to allow the finger 18a to be released therefrom, and thus produce a sound, at a position corresponding to when the pointer 13 overlaps one of the visual marks 15, 16, and 17.

Additionally, in the alternative embodiment depicted in FIG. 17, the drum 5 can include a plurality of indentations 34 spaced around the collar 9. When the pointer 13 overlaps one of the visual marks 15, 16, and 17, each of the protrusions 10a (see FIG. 15) on a face of the follower elements 10 fits within one of the indentations 34. Accordingly, when the protrusions 10a are positioned within one of the indentations 34, the rotary slide 11 can be held in place at the setting corresponding to the desired predetermined size of the ground product.

As can be seen particularly well in FIGS. 2, 3, 5, and 11, the rotor 4 is provided with a series of radial tabs 20 extending to an outer periphery of a bushing 21 of the rotor 4. The tabs 20 can become trapped between axial ribs 22 formed on the inside wall of the drum 5 to prevent the rotor 4 from rotating during grinding. The radial tabs 20 can fit freely between the ribs 22 of the body 5, preferably with some rotary play.

The bushing 21 of the rotor 4 is continuously braced against the lower face 12 of the slide 11, in order to follow the upward and downward axial displacement of the slide 11 continuously as a function of the adjustment to be obtained. To continuously brace the rotor 4 against the lower face 12 of the slide 11, the rotor 4 is provided with a series of flexible tabs 23 that extend radially from the bushing 21. The flexible tabs 23 can alternate with the radial tabs 20. The flexible tabs 23 can be elastically deformed in an axial direction by contact against the upper face of a collar 24 of the stator 3. Thus, the flexible tabs 23 keep the rotor 4 in continuous contact with the slide 11, regardless of its position relative to the inclined surfaces 8 of the drum 5. Additionally, the flexible tabs keep the teeth 31 of the rotor 4 separated from the stator 3.

The stator 3 can be kept in place on the neck 6 of the reservoir 2, as discussed below. A first internal peripheral bead 25 can be positioned on the drum 5, close to the ribs 22. A collar 24 of the stator 3 can engage with the bead 25 so as to position the stator 3 within the drum 5. A second internal peripheral bead 26, made at a distance from the first bead 25, is located close to the lower end of the drum 5. The drum 5 is configured to be attached to the reservoir 2 by elastically deforming a distance so as to allow a peripheral shoulder 27 of the reservoir 2 to fit within the second bead 26. The second bead 26 is located at a distance such that the peripheral shoulder 27 reaches the second bead 26 at the instant at which the collar 24 of the stator 3 becomes braced on the neck 6 of the reservoir 2. Thus, the stator 3 and the drum 5 can be positioned axially with the reservoir 2 unit during assembly.

Therefore, the stator 3 and the drum 5 can be delivered as a preassembled grinder unit, ready to be disposed on the neck 6 of the reservoir 2.

In addition, as seen in FIG. 4, the stator 3 can include peripheral tabs 28 extending axially from the lower face of its collar 24. The peripheral tabs 28 are configured to become trapped between bosses 29 formed on the external periphery of the neck 6 of the reservoir 2, permitting the stator 3 to become immobilized with respect to rotation during grinding.

A gap is preferably provided between the tabs 28 of the stator 3 and the bosses 29 of the reservoir 2 to obtain an angular clearance to permit easy assembly on an automatic assembly line, without preliminary angular positioning of the stator 3 relative to the reservoir 2.

The adjustable grinder 1 can include a cap 30, as shown in FIG. 8, configured to be positioned on the drum 5. The cap 30 can include a continuous ring on a bottom portion thereof that corresponds to a receiving area in the drum 5 such that the cap 30 can be removably attached to the drum 5. Alternatively, the bottom portion of the cap 30 can be extended and the cap 30 may include a plurality of individual sections spaced around the cap 30 such that the cap 30 can be removably attached to the drum 5.

In an exemplary embodiment, all of the constituent parts of the device described above can be obtained by injection molding of a plastic material.

An exemplary order of assembly for the adjustable grinder 1 shown in FIGS. 2 and 3 will now be described. The drum 5 is disposed vertically and the slide 11 is engaged from above by positioning the pointers 13 in openings 14 of the drum 5. An axial thrust is exerted from top to bottom to permit the catches of follower element 10 on the slide 11 to snap around the inclined surfaces 8 of the drum 5.

Next, the rotor 4 is positioned inside the drum from below such that the collar 21 of the rotor 4 contacts the bottom of the collar 12 of the slide 11. Additionally, the radial tabs 20 of the rotor 4 become trapped between the ribs 22 of the drum 5.

The stator 3 is then introduced into the drum 5 from below such that its collar 24 snaps around bead 25 of the drum 5 to form the preassembled unit for being installed on the neck 6 of the reservoir 2. The preassembled elements constitute a ready-to-assemble subassembly.

The preassembled unit is then fixed onto the neck 6 of the reservoir 2 by snapping the bead 26 of the drum 5 onto the peripheral shoulder 27 of the reservoir 2. A cap 30 is then mounted on the drum.

In an alternative exemplary embodiment, a follower element of the rotary slide 11 could include at least one inclined surface that forms a ring. The at least one inclined surface of the rotary slide 11 could contact the at least one inclined surface 8 formed on the lower face of the collar 9 of the drum 5. Thus, the lower face of the inclined surface of the slide 11 would be in permanent contact with the rotor 4 such that a rotary movement of the slide 11 causes a variation of the spacing of the rotor 4 relative to the stator 3. The inclined surface of the slide 11 could be divided into four separate inclined surfaces to correspond to four inclined surfaces on the collar 9. Further, the slide 11 can be assembled from below the drum 5.

FIG. 9 shows an external view of a fully assembled adjustable grinder 1. Additionally, FIGS. 11, 12, and 13 shown sectional views, taken along the lines shown in FIG. 10, of a fully assembled adjustable grinder 1.

Numerous modifications of the above-described exemplary embodiments are also understood to be within the scope of the present invention. For example, an alternative number of grind sizes, such as 2 or 4, could be achieved by the adjustable grinder. Additionally, the visual marks could have a different shape, or could be numbers or letters, to indicate the respective grind sizes.

Additional modifications could include increasing or decreasing the size of the adjustable grinder 1 such that each component is scaled up or down by a same amount. Alternatively, the number of teeth of the rotor 4 and stator 3 could change when the size of the adjustable grinder 1 is changed.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. An adjustable grinder, comprising:
   a container configured to hold a product to be ground;
   a stator including at least two rows of teeth and at least two extended teeth that extend further in a radial direction towards a center axis of the stator than the at least two rows of teeth of the stator, the stator being positioned on the container;
   a rotor including at least two rows of teeth positioned opposite to the stator and configured to rotate with respect to the stator;
   a drum positioned around the rotor; and
   a rotary slide including a pointer that is configured to be adjusted such that a distance between the stator and the rotor increases or decreases,
   wherein the at least two rows of teeth of the stator face the at least two rows of teeth of the rotor such that the product is ground between the stator and the rotor.

2. The adjustable grinder of claim 1, wherein
   the drum includes at least three holes and each of the at least three holes corresponds to a different size of a ground product, and
   the pointer is configured to be adjusted between the at least three holes such that a respective predetermined distance between the stator and the rotor is achieved at each hole.

3. The adjustable grinder of claim 2, wherein one of the at least two rows of teeth of the stator and one of the at least two rows of teeth of the rotor grind the product only when the pointer is adjusted to point to one of the at least three holes that corresponds to a smallest size of the ground product.

4. The adjustable grinder of claim 3, further comprising:
   at least one acoustic indicator configured to produce a sound when the pointer is adjusted to point to each of the at least three holes.

5. The adjustable grinder of claim 1, wherein
   the rotary slide includes at least one follower element configured to move along an inclined surface of the drum, and
   when the pointer is adjusted, the at least one follower element moves along the inclined surface such that the rotary slide translates in an axial direction.

6. The adjustable grinder of claim 5, wherein
   the rotor includes a plurality of flexible tabs configured to keep the rotor in contact with the rotary slide, and
   when the pointer is adjusted such that the rotary slide translates in the axial direction, the rotor translates in the axial direction.

7. The adjustable grinder of claim 1, wherein
   the rotor includes at least one tab extending from a surface thereof,
   the drum includes a plurality of ribs extending from a surface thereof, and
   the plurality of ribs block the at least one tab to prevent the rotor from rotating with respect to the drum.

8. The adjustable grinder of claim 1, wherein
   the stator includes at least one tab extending from a surface thereof,
   the container includes a plurality of ribs extending from a surface thereof, and
   the plurality of ribs block the at least one tab to prevent the stator from rotating with respect to the container.

9. The adjustable grinder of claim 1, further comprising:
   a cap positioned on an end of the drum.

10. The adjustable grinder of claim 1, wherein rotating the drum with respect to the container rotates the rotor with respect to the stator such that the product to be ground between the rotor and the stator is ground.

11. The adjustable grinder of claim 1, wherein the rotor includes a plurality of fingers that extend further in a radial direction away from a center axis of the rotor than the at least two rows of teeth of the rotor.

12. The adjustable grinder of claim 11, wherein the at least two extended teeth of the stator and the plurality of fingers of the rotor are positioned such that the product to be ground is forced by the at least two extended teeth and the plurality of fingers towards the at least two rows of teeth of the stator and the at least two rows of teeth of the rotor.

13. The adjustable grinder of claim 1, wherein the at least two rows of teeth of the stator include a first row of teeth and a second row of teeth, the first row of teeth extends from a top edge of the stator to a bottom edge of the stator, and the second row of teeth is positioned at the top edge of the stator and does not extend to the bottom edge of the stator.

14. The adjustable grinder of claim 13, wherein the at least two extended teeth extend from a top edge of the stator to a bottom edge of the stator, the at least two extended teeth extend further in the radial direction towards the center axis of the stator than the first row of teeth of the stator at the bottom edge of the stator, and the at least two extended teeth extend a same distance in the radial direction towards the center axis of the stator as the first row of teeth of the stator at the top edge of the stator.

\* \* \* \* \*